W. M. THOMAS.
SUPPORT FOR CAMERAS, MACHINE GUNS, AND THE LIKE.
APPLICATION FILED JUNE 14, 1917.
1,272,574.
Patented July 16, 1918.
3 SHEETS—SHEET 1.
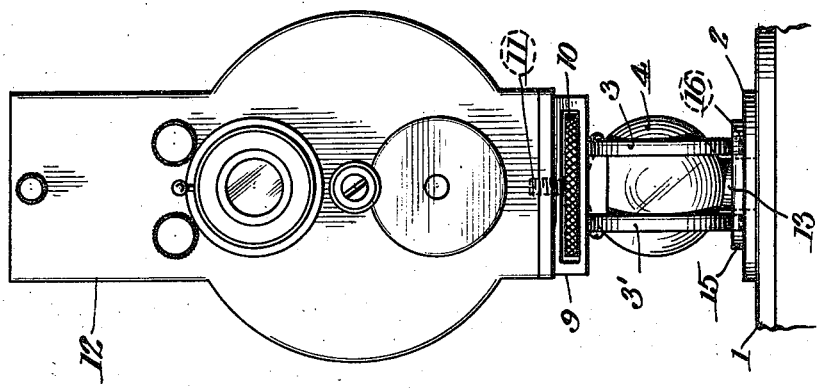
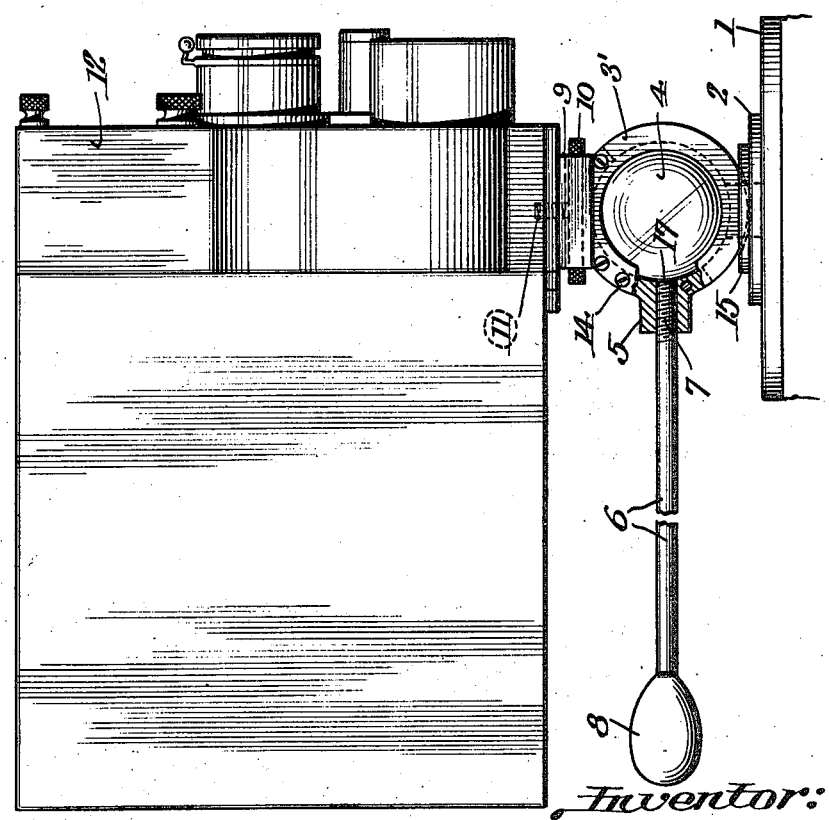

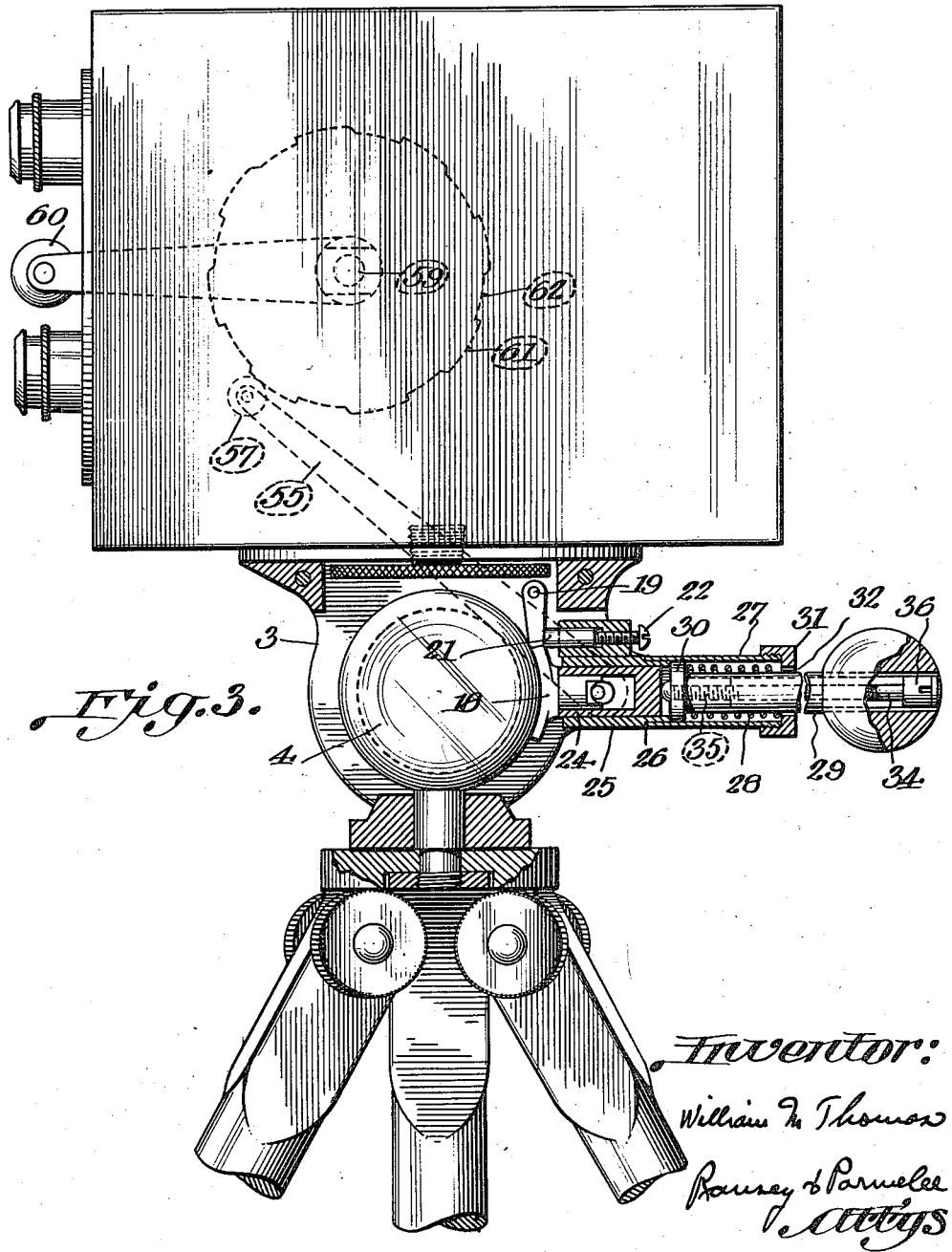

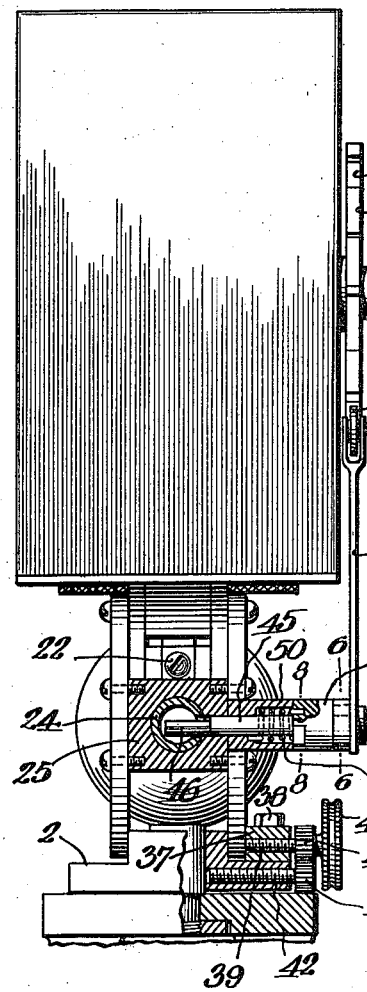
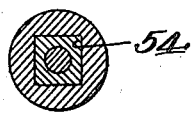
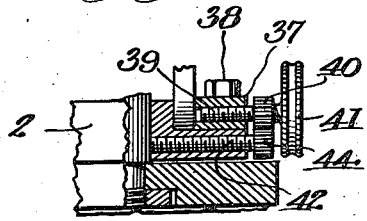
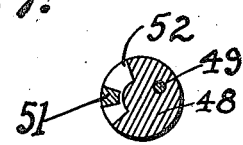
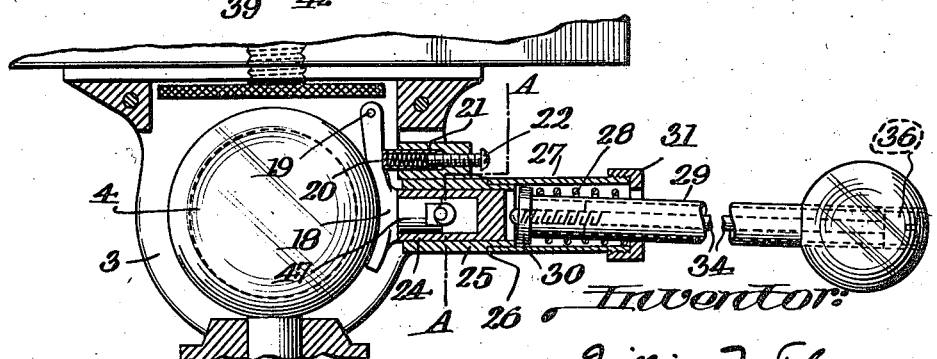

UNITED STATES PATENT OFFICE.

WILLIAM M. THOMAS, OF NEW YORK, N. Y., ASSIGNOR TO THOMAS-OBERKIRCH COMPANY, LIMITED, OF NEW YORK, N. Y., A CORPORATION OF NEW YORK.

SUPPORT FOR CAMERAS, MACHINE-GUNS, AND THE LIKE.

1,272,574.  Specification of Letters Patent.  Patented July 16, 1918.

Application filed June 14, 1917. Serial No. 174,820.

*To all whom it may concern:*

Be it known that I, WILLIAM M. THOMAS, a citizen of the United States, and a resident of the city of New York, in the county and State of New York, have invented certain new and useful Improvements in Supports for Cameras, Machine-Guns, and the like, of which the following is a specification.

The present invention relates broadly to supports and more particularly to a universally movable mount between a base or foundation member and an instrument to be directed, such as a camera, machine gun, telescope, or similar device.

The principal object of the present invention is to provide a universally movable mount, such as a tripod head, wherein an instrument carried thereby may be directed in any direction, within operating limits of the device, and locked in any predetermined directed position.

One object of the invention is the providing of a camera having attached therewith a supporting means adapted to permit of the swinging of the camera structure to any desired position by a single operator continuously during the actuation of the moving picture taking mechanism.

A further object of the present invention is to provide a universally movable mount for cameras, machine guns and the like, wherein the instrument carried thereby may be directed in any direction within the limits of the mount, and wherein the vertical plane of the instrument is maintained vertical during adjustments.

Another object of the present invention is to provide a rigidly supported sphere on which is mounted means having movement around the axis of the support for the sphere, and also having movement parallel to a plane including the center of the sphere and the axis of the support of the sphere thereby providing a universal movement for the carrying platform attached to the means.

Another object of the present invention is a device as specified in the previous paragraph and provided with a locking brake carried by the means and constructed to engage the sphere thereby locking the parts in any predetermined adjusted position.

A more complicated form of the present invention contemplates providing the mount with a spring pressed lock so constructed that a movement of the handle in a given direction releases the lock or brake thereby permitting adjustment of the carrying platform in the direction of the pull upon the handle, and whereby the releasing of the handle automatically resets the lock or brake.

A still further and more specific object of the present invention contemplates the construction specified in the previous paragraph as being provided with mechanism operative consonantly with the operation of moving picture mechanism whereby the brake or lock is released during the period of movement of the film, and is locked while the film is stationary to enable the device to be operated in photographing panorama moving pictures.

Another object of the present invention is to provide a device of the character specified wherein the parts may be locked against rotation in one plane and free to rotate in a plane at right angles to the first mentioned plane, or vice versa.

Other and further objects of the present invention will in part be obvious and will in part be pointed out hereinafter in the specification following by reference to the accompanying drawings forming a part thereof, and wherein like parts are designated by like characters throughout the several figures thereof.

Figure 1 is a view showing a side elevation of the apparatus with a portion thereof shown in section.

Fig. 2 is an end view of the structure shown in Fig. 1.

Fig. 3 is an elevational view of a more complex embodiment of the same invention.

Fig. 4 is a view showing the end elevation of the device illustrated in Fig. 3.

Fig. 5 illustrates the operation of the device shown in Figs. 3 and 4.

Fig. 6 is a section on lines 6—6 of Fig. 4.

Fig. 7 is a detail view of the clamping mechanism showing the base ring clamped to the support for the sphere.

Fig. 8 is a view taken on lines 8—8 of Fig. 4.

In the art of supports, particularly as adapted for moving picture cameras, machine guns, observation telescopes, etc., it is desirable that a support be provided wherein the instrument may be quickly and accurately pointed in a given direction and operated without necessity of locking the supporting pivot. Such support requires rigid constructions which will not vibrate unduly while free to be moved universally. It is also desirable in the use of instruments of the character specified that the mount be capable of quickly being locked to maintain the instrument pointing in a predetermined direction, and at the same time be capable of being quickly unlocked to change the direction of the instrument. The present invention provides a device that includes the foregoing specified desirable features and comprises primarily a rigidly supported sphere that carries rings or cheek plates or equivalent structures which may be turned on this sphere on the axis of the rings or may be turned around the sphere on the axis of the support thereof. Preferably these rings are guided so that the rotation around the axis of the rings is always at a predetermined angle, preferably a right angle, to the axis of the support for the sphere. This construction maintains the directing instrument in a definite position relatively to the support.

In the drawings 1 designates the platform of a tripod provided with a supporting disk 2 having mounted thereon an annular socket which has in turn mounted thereon a ball 4 on which said socket vertically and circumferentially turns in either direction. The frame of the socket has formed thereon a bearing 5 internally threaded and has mounted therein a rod 6 threaded at its end as at 7 and provided with a handle 8. Said socket has mounted on its top a hollow transverse shoulder 9 having mounted therein a hand wheel 10 carrying a threaded stud 11 adapted to receive an aperture in the bottom of the mechanism casing 12.

The platform or base 1 carries an upwardly extending supporting cylinder 13 upon which the ball or sphere 4 is rigidly mounted so that in effect the sphere is but a continuation of the base 1. The annular socket may comprise a pair of rings 3 and 3' which embrace the sides of the sphere 4, and less than one-half thereof, and carry the bearing 5 which may comprise a filler block that is an extension of the shoulder or platform 9. The filler block 5 may be secured to the rings 3 and 3' in any well known manner, such as by use of machine screws 14. The disk or rotating base 2 is free to rotate around the supporting cylinder and slides upon the base 1. The upper part 15, which is integral with the lower portion of the rotating base 2, is recessed as at 16 (Figs. 1 and 2) to form guiding recesses for the rings 3 and 3' thereby maintaining the plane of the rings substantially parallel to the axis of the supporting cylinder 13 and the axis of rotation of the rings at substantially right angles to the axis of the supporting cylinder. While I have shown a moving picture camera 12 mounted upon the supporting platform 9, I desire that this instrument be considered as merely representative of any type of device with which this support may be useful.

In operation the handle 8 is rotated to unscrew the threaded parts 7 from the bearing 5 thereby removing the end 17 of the rod 6 from contact with the sphere 4 thus unlocking the rings and permitting the handle 8 to be utilized as a guiding member to turn the rings upon the supporting sphere 4. When it is desired to lock the parts all that is necessary is to turn the handle 8 to screw the rod inwardly until the end 17 clamps tightly against the face of the sphere 4 whereby the parts are securely locked in position.

Referring now more particularly to the device disclosed in Figs. 3 to 8, inclusive, it will be noted that a slightly more complicated mechanism is utilized for locking and holding the parts. In this construction a brake shoe 18 is pivoted as at 19 and is normally in light frictional engagement with the sphere 4 because of the action of the compression spring 20 in the housing 21. The compression of this spring may be regulated by the adjustment screw 22 and preferably is so regulated that the shoe 18 maintains a sufficient frictional engagement to introduce resistance that has a stabilizing effect when the locking mechanism is released and the parts are being moved. The brake shoe 18 is provided with a shoulder against which rests a hollow cylinder 24 that is guided in the block 25 which is mounted between the rings 3 and 3'. A shoulder 26 is provided adjacent the end of the hollow cylinder and the block 25 carries a short tube 27 that encompasses said shoulder and comprises a retaining member for a relatively heavy coiled spring 28 that surrounds the operating handle 29 and bears against the head 30 thereby normally tending to seat this head against the shoulder 26 (shown in Fig. 3). A cap 31 is provided on the outer end of the tube and has an opening 32 therein of sufficient size to permit slight angular movement of the operating handle 29. The operating handle 29 is hollow and carries a pressure rod 34 which is screw threaded, as at 35, in order that the amount of the pressure rod extending through the head 30 may be regulated by means of the kerfed head 36 on the rod in order that the pressure rod will contact with the end of the hollow cylinder 24 and transmit the force in the coiled spring 28 to the brake shoe 18 when the parts are in the position illustrated in Fig. 3. When it is desirable to adjust the device in order that the instrument carried thereby may be pointed in a particular direction, all that is necessary is to pull the operating handle 29 in the normal direction that will point the instrument as desired. The first effect of this action is to set up an angular relation between the axis of the operating handle and the axis of the short tube 27 thereby tilting the head 30 from the shoulder 26 consequently removing the end of the pressure rod 34 from contact with the hollow cylinder 24 thus relieving the brake shoe 18 from the pressure of the coiled spring 28 and rendering the parts free to be moved as the operator pulls or pushes sidewise on the handle. It is to be noted that under these conditions the operating handle 29 contacts with the sides of the opening 32 whereby a direct leverage is established between the parts to assist in the adjustment.

In devices of this character it is often desirable to be able to lock the instrument in order to sweep a definite predetermined plane, or effective zone, either in a vertical or horizontal plane of movement. To this end the clamping mechanism illustrated in Figs. 4 and 6 is provided. This mechanism comprises a block 37 that is secured to the rotating base 2 by suitable stud screws 38, or similar devices. This block is screw threaded and carries a clamp screw 39 which is provided with a small pinion 40 and terminates in a thumb piece 41. The rotating base 2 is likewise screw threaded and carries a longer clamp screw 42 that is provided with a small pinion 44 which is in mesh with the pinion 40 carried by the clamp screw 39. The direction of threads on both clamp screws is the same and the clamp screw 39 engages the side of the ring 3 to lock the ring to the rotating base 2 so that the rings 3 and 3' cannot be rotated around their axis but may be rotated around the axis of the supporting cylinder for the sphere. The longer clamp screw 42 engages the side of the supporting cylinder 13 and locks the rotating base 2 to this cylinder thereby preventing any rotation of the parts around the axis of the sphere supporting cylinder 13. It is to be noted that the function of the small pinions 40 and 44 is to reverse the rotative movement of the clamp screw 42 relatively to the movements of the clamp screw 39 so that should the thumb piece 41 be turned to tighten the clamp screw 39 the pinions will operate to unseat the clamp screw 42 from engagement with the cylinder 13, as is shown in Fig. 4, and vice versa if the thumb piece 41 is operated to release or unclamp the ring 3 then continued rotative movement in this direction will clamp or lock the clamp screw 42 against the cylinder 13, as is shown in Fig. 7. There is a sufficient difference between the lengths of these clamp screws to enable the thumb piece to be operated to release both clamp screws from effective operation thereby rendering the parts freely movable.

In moving picture work, particularly panoramic work, wherein a panoramic view is being photographed it is the common practice to move the camera continuously to sweep the particular view being photographed and to operate the camera mechanism during this continuous movement. The effect of this operation is to produce blurring of the distant objects being photographed. This difficulty may be obviated by maintaining the camera stationary during the moment of time while the picture is being exposed and then moving the camera at the time when the film is moving and is blanketed by the shutter of the camera. In other words producing an intermittent movement of the camera which is consonant with the intermittent movement of the film. To this end the mount shown in Figs. 1 to 8 further contemplates the addition of a rotating shaft 45 that is provided with an eccentric portion 46 that contacts with a pressure block 47 that rests upon the shoulder of the brake shoe 18. This shaft 45 carries a rotating head 48 with which is connected the helical spring 49 that normally tends to relieve the pressure block 47 of the pressure from the eccentric member 46. The helical spring is carried by the housing 50 which is provided with a stop lug 51 that extends into an opening 52 in the head 48 thereby limiting the movement of the head 48 when the helical spring 49 is free to act upon the shaft 45. The outer end of the head 48 is reduced to a square cross-section 54 which is adapted to carry an operating arm 55 that is locked in position on the head 48 by the thumb screw 56. The operating arm 55 carries at its outer end a small antifriction roll 57 that engages a toothed disk which is mounted to rotate with the operating shaft 59 of a moving picture camera that carries the operating handle 60. This toothed disk is provided with raised portions 61 and with depressions 62. The raised portions 61 are of such length and arrangement that while the antifriction roll 57 is in engagement with a raised portion (see Fig. 3) the film within the camera is stationary and being exposed. At this time the arm 55 has been rotated sufficiently to cause the eccentric portion 46 to force the pressure block 47 tightly against the friction shoe thereby locking the parts. Immediately as the roll 57 drops into a depression 62 the helical spring 49 rotates the shaft 45 causing the eccentric portion 46 to relieve the pressure block 47 of pressure thereby releasing pressure on the friction shoe 18 to enable the camera carrying portion to be moved. Assuming that it is desired to take a panoramic view of a landscape the clamping screws are operated to clamp the rings against vertical movement, as is shown in Fig. 4. The operator then steadily pulls or pushes on the operating handle 29 and turns the crank 60. Under the action of the toothed disk and connected mechanism the shoe 18 is intermittently clamped and released. It will therefore be seen that under these conditions the camera will be swung through the desired horizontal arc by an intermittent step by step movement, each time with the camera stationary when an exposure is being made and moved to a new position during the time when the film is being moved.

This application is a continuation in part of applicant's prior application Serial No. 18,574, filed April 1, 1915.

Realizing that the present inventions may be embodied in structures other than the specific mechanisms herein illustrated I desire that the specific disclosures be understood as illustrative and not to be taken in the limiting sense.

Having thus described my invention what I claim is:—

1. In a device of the character described, in combination, a supporting base, a cylindrical member secured to said supporting base, a sphere fixedly mounted upon said cylindrical member, sphere inclosing means adapted to have movement in two directions within predetermined limits upon said sphere, a device to restrain said means from any movement in a third direction, a carrying platform fixedly secured to said sphere inclosing means, and a clamping member carried by said sphere inclosing means and being adaptable to lock said means to said sphere.

2. In a device of the character described, in combination, a supporting base, an upwardly extending member secured to and carried by said supporting base, a sphere fixedly mounted upon said member, sphere inclosing means having movement in two directions within predetermined limits, a member to restrain said means from any movement in a third direction, a handle, locking devices controlled by said handle and operative to lock said sphere inclosing means to said sphere, and mechanism carried by said sphere inclosing means to enable an instrument to be secured to said means.

3. In a device of the character described, the combination of a supporting base, a sphere supporting member rigidly secured to said base, a sphere upon said member, means mounted upon said sphere and adaptable for rotation around the axis of said member and also around the axis passing through the center of said sphere and at right angles to the axis of said member, devices to restrain said means from movement in the third direction, attaching devices carried by said means whereby a suitable instrument may be secured thereto, and mechanism for locking said means to said sphere.

4. In a device of the character described, a rigidly mounted supporting sphere, an instrument supporting means carried by said sphere and rotatable relatively thereto in such manner that the central plane of said means always includes a predetermined fixed line passing through the center of said sphere and comprising the axis of the support for the sphere.

5. In a device of the class described, in combination, a rigidly mounted supporting sphere, an instrument carrying means mounted upon said sphere for movement in two directions between predetermined limits relatively thereto, a rotating base adapted to rotate around the axis of the support for said sphere and adapted to guide said means to prevent movement of said means in a third direction.

6. A supporting device of the character described, comprising a fixedly mounted supporting sphere, instrument supporting means carried by said sphere having rotative movement thereon in two directions, a rotatable base operatively connected with said means and adapted to prevent movement of said means in a third direction.

7. In a device of the character described comprising in combination, a supporting base, a cylindrical mount rigidly carried by said supporting base, a supporting sphere fixedly mounted upon said cylindrical mount, a rotating base carried upon said cylindrical mount and rotatable relatively thereto, a pair of rings inclosing opposite sides of said sphere, guide surfaces being provided on said rotatable base and adapted to coöperate with said rings whereby said rings are rotatable in only two directions upon said sphere, and a supporting platform carried by said rings.

8. In a device of the character described, in combination, a rigidly mounted supporting sphere, instrument carrying means mounted upon said sphere for movement in two directions between predetermined limits with one axis of said means being maintained at all times coincident with a fixed axis extending through the center of said sphere, a locking device carried by said means and in operative relation to said sphere, a directing handle, and devices operatively connected with said handle and said locking device so that the operation of said handle to direct the said means automatically unlocks the locking device.

9. A device of the character described, comprising in combination, a rigidly mounted supporting sphere, instrument supporting means carried by said sphere and rotatable relatively thereto, a locking mechanism carried by said means and in operative engagement with said sphere, a directing handle, and automatically operated means for releasing said locking mechanism when said handle is operated to direct the said means.

10. A device of the character described, comprising a rigidly mounted supporting sphere, instrument supporting means carried by said sphere and rotatable relatively thereto, a friction lock carried by said means and in operative engagement with said sphere, an operating handle, and devices for automatically releasing said lock when said handle is operated to direct the said means.

11. A device of the character specified comprising a rigidly mounted supporting sphere, instrument supporting means carried by said sphere and rotatable relatively thereto, a friction lock for normally preventing rotation between said sphere and said means, and devices for rendering said lock ineffective when said means is being directed.

12. A device of the character described, comprising in combination, a rigidly mounted supporting sphere, instrument supporting means carried by said sphere and rotatable relatively thereto, a lock normally preventing rotation between said sphere and said means, devices for directing said means, and mechanism for automatically releasing said lock when said directing means are being operated.

13. A supporting device of the character described comprising, in combination, a supporting sphere, instrument supporting means carried by said sphere and rotatable relatively thereto, a friction shoe adapted to engage said sphere, an operating handle, a spring normally urging said handle toward said shoe, an adjustable member operatively connected with said handle and adapted to regulate the degree of pressure transmitted to said shoe from said spring, and means whereby the operation of said handle renders said shoe ineffective to lock said instrument supporting means to said sphere.

14. A device of the character described, comprising a rigidly mounted supporting sphere, instrument supporting means carried by said sphere and rotatable relatively thereto, a friction shoe continuously maintained in engagement with said sphere, an operating handle, and means controlled by said handle whereby radial forces are applied to said shoe to substantially lock said shoe to said sphere thereby normally preventing rotatable movement between said instrument supporting means and said sphere.

15. In a device of the class described, in combination, a rigidly mounted supporting sphere, instrument carrying means mounted upon said sphere and rotatable relatively thereto in two directions between predetermined limits, and clamping devices for restricting the movement of said means to a single rotative direction at the will of the operator.

16. A device of the class described comprising, in combination, a rigidly mounted supporting sphere, instrument supporting means carried by said sphere and rotatable relatively thereto in such manner that the central plane of said means always includes a predetermined fixed line passing through the center of said sphere and comprising the axis of the support for said sphere, and devices whereby the movement of said means may be restricted to a single rotative direction.

17. In a device of the character described, in combination, a supporting base, a sphere fixedly mounted relatively to said base, a pair of oppositely disposed rings encompassing opposite sides of said sphere and movable in two directions thereon, and clamping means for restricting the movement of said rings to a single one of said directions.

18. In a device of the character described, in combination, a supporting base, a supporting cylinder rigidly secured to said base, a sphere fixedly mounted on said cylinder, a pair of oppositely disposed rings encompassing opposite sides of said sphere and movable upon said sphere, a rotating base upon said cylinder and rotatable around the axis thereof, a pair of clamp screws carried by said rotating base, one of said screws being adapted to lock said base to said cylinder, the other of said screws being adapted to lock said rotating base to said rings, and means provided on said rotating base for causing said base to be at all times in operative connection with said rings.

19. In a device of the character described, in combination, a supporting base, a cylinder fixedly mounted upon said supporting base, a sphere fixedly mounted on said cylinder, a pair of rings encompassing opposite sides of said sphere and movable upon said sphere, a rotatable base adapted to rotate around said cylinder, a pair of clamp screws, one of said clamp screws being adapted to clamp said rings against movement around the axis of the rings, the other of said clamp screws being adapted to clamp said rings against rotation around the axis of said supporting cylinder, and operative mechanism connecting said clamp screws whereby the effective operation of one clamp screw renders the other clamp screw ineffective.

WILLIAM M. THOMAS.